United States Patent
Huotari

(10) Patent No.: US 10,129,390 B2
(45) Date of Patent: Nov. 13, 2018

(54) PROCESSING TEST CALLS FROM ELEVATOR EMERGENCY TELEPHONES

(71) Applicant: Tommi Huotari, Riihimaki (FI)

(72) Inventor: Tommi Huotari, Riihimaki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 15/260,620

(22) Filed: Sep. 9, 2016

(65) Prior Publication Data
US 2017/0019528 A1    Jan. 19, 2017

Related U.S. Application Data

(63) Continuation of application No. PCT/FI2014/050229, filed on Mar. 28, 2014.

(51) Int. Cl.
H04M 1/24    (2006.01)
H04M 3/08    (2006.01)
(Continued)

(52) U.S. Cl.
CPC ............. H04M 3/10 (2013.01); B66B 5/00 (2013.01); B66B 5/02 (2013.01); G08B 29/12 (2013.01); H04M 11/04 (2013.01)

(58) Field of Classification Search
USPC ............ 379/27.02, 37, 40; 455/404.1, 404.2
See application file for complete search history.

(56) References Cited

U.S. PATENT DOCUMENTS 5,016,269 A * 5/1991 Rogers ................ H04W 76/007
                                                            379/40
5,239,570 A * 8/1993 Koster ................ H04M 3/4228
                                                            379/279
(Continued)

FOREIGN PATENT DOCUMENTS

CN    1134639 A    10/1996
EP    0792057 A1    8/1997
(Continued)

OTHER PUBLICATIONS

International Search Report PCT/ISA/210 for International Application No. PCT/FI2014/050229 dated Jan. 22, 2015.
(Continued)

*Primary Examiner* — Quoc D Tran
(74) *Attorney, Agent, or Firm* — Harness, Dickey & Pierce, P.L.C.

(57) ABSTRACT

The invention allows utilizing Caller Line Identification (CLI) feature in receiving test emergency calls from any kind of elevator emergency telephones. A call attempt including CLI information from an elevator emergency telephone is received at an elevator emergency call receiver unit. The CLI information is detected. Then, one of the following is performed: a) disconnecting the call attempt to complete the test call processing; b) in response to detecting the call attempt being released by the elevator emergency telephone within a predetermined time period, determining that the test call processing is completed; and c) in response to detecting the call attempt not being released by the elevator emergency telephone within the predetermined time period, answering the incoming call to enable the elevator emergency telephone to continue the test call processing.

12 Claims, 5 Drawing Sheets

(51) Int. Cl.
   *H04M 3/22* (2006.01)
   *H04M 3/10* (2006.01)
   *B66B 5/02* (2006.01)
   *H04M 11/04* (2006.01)
   *G08B 29/12* (2006.01)
   *B66B 5/00* (2006.01)

(56) References Cited

U.S. PATENT DOCUMENTS

| | | | |
|---|---|---|---|
| 5,736,694 A * | 4/1998 | Ketoviita | B66B 5/0025 |
| | | | 187/247 |
| 5,859,894 A * | 1/1999 | Ortiz Perez | H04M 1/24 |
| | | | 379/1.01 |
| 5,974,115 A | 10/1999 | Chan et al. | |
| 6,002,746 A * | 12/1999 | Mulcahy | H04M 3/22 |
| | | | 379/22 |
| 6,201,854 B1 | 3/2001 | Avitsur et al. | |
| 6,212,258 B1 * | 4/2001 | Bella | H04M 1/24 |
| | | | 379/27.03 |
| 6,628,756 B2 | 9/2003 | Avitsur et al. | |
| 7,272,402 B1 | 9/2007 | Ho et al. | |
| 7,680,250 B1 * | 3/2010 | Zilles | H04L 43/50 |
| | | | 379/10.03 |
| 8,019,358 B1 | 9/2011 | Ho et al. | |
| 8,032,109 B1 | 10/2011 | Ho et al. | |
| 8,121,613 B1 | 2/2012 | Ho et al. | |
| 8,184,785 B2 * | 5/2012 | Kuroda | B66B 3/00 |
| | | | 379/106.01 |
| 8,219,061 B1 | 7/2012 | Ho et al. | |
| 8,306,553 B2 | 11/2012 | Ho et al. | |
| 8,503,973 B1 | 8/2013 | Ho et al. | |
| 8,744,400 B1 | 6/2014 | Ho et al. | |
| 8,838,143 B1 | 9/2014 | Ho et al. | |
| 8,948,348 B2 * | 2/2015 | Rytila | B66B 5/0093 |
| | | | 379/27.02 |
| 2001/0009576 A1 | 7/2001 | Avitsur et al. | |
| 2007/0178879 A1 * | 8/2007 | Chambron | H04M 11/025 |
| | | | 455/404.1 |
| 2011/0287782 A1 | 11/2011 | Ho et al. | |

FOREIGN PATENT DOCUMENTS

| | | |
|---|---|---|
| EP | 2487888 A1 | 8/2012 |
| EP | 2490423 A1 | 8/2012 |
| WO | WO-00/33542 A1 | 6/2000 |

OTHER PUBLICATIONS

Chinese Office Action dated Jan. 29, 2018 by the State Intellectual Property Office (SIPO) for corresponding application No. CN2014800775677.

* cited by examiner

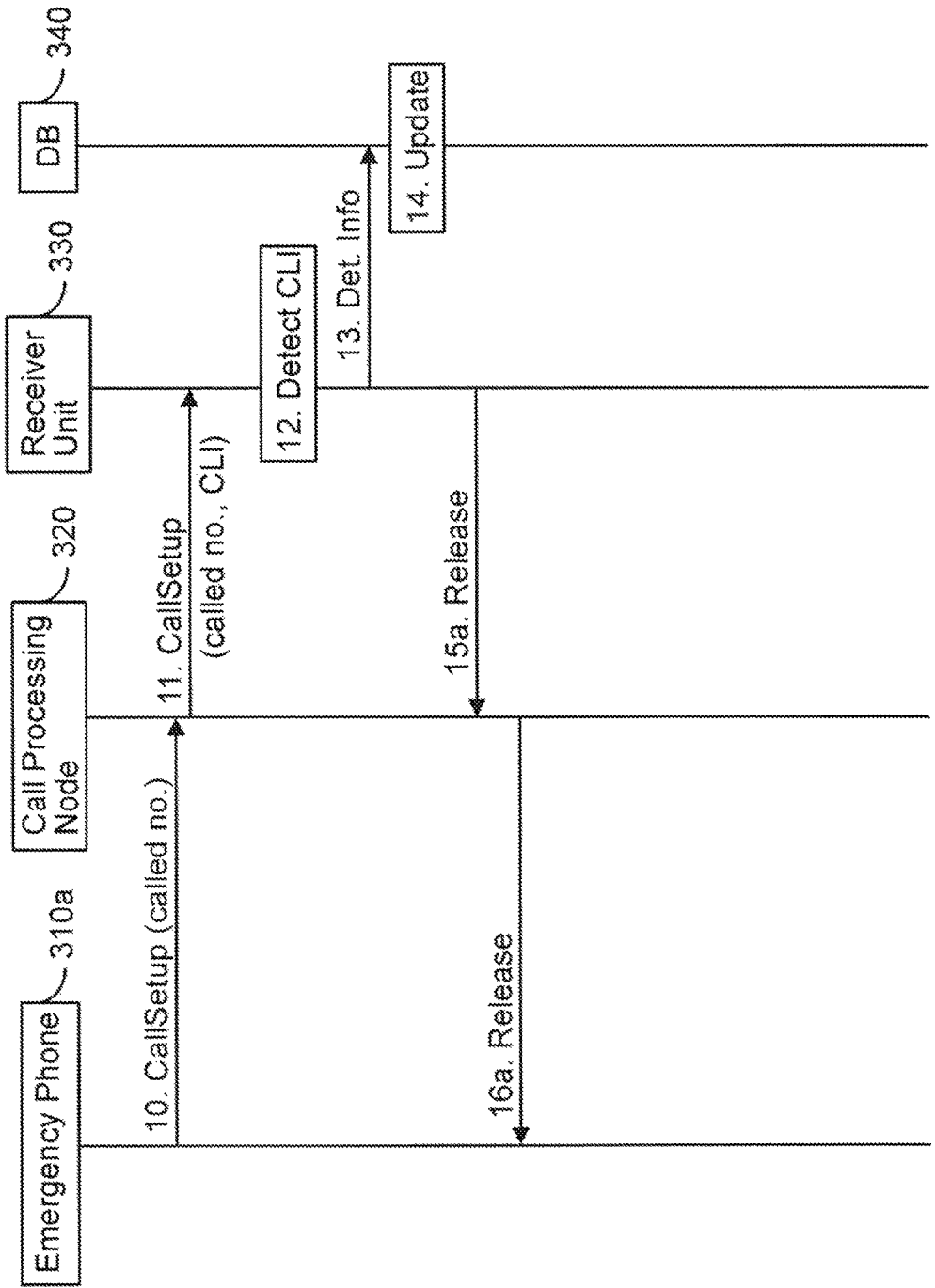

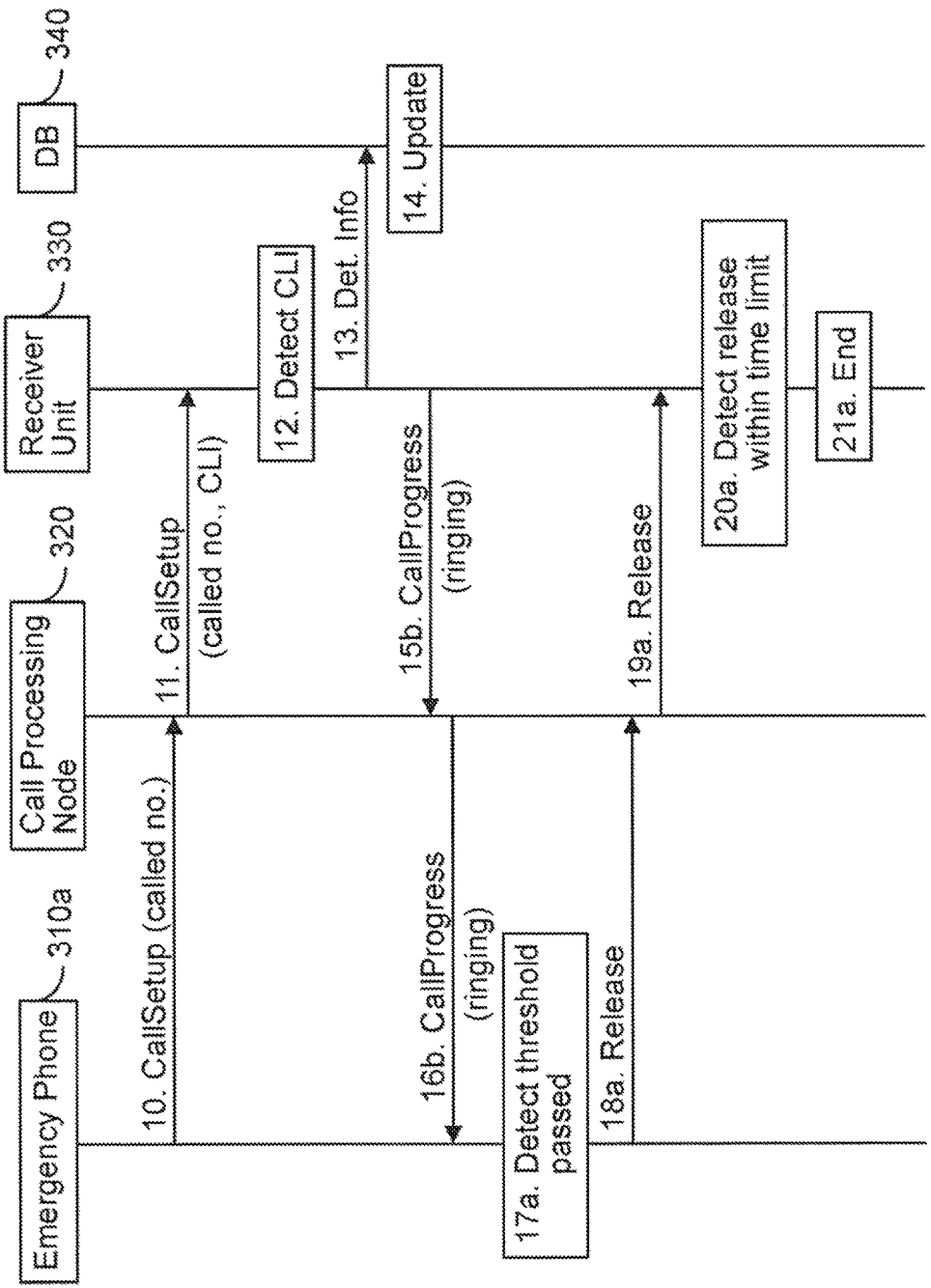

US 10,129,390 B2

PROCESSING TEST CALLS FROM ELEVATOR EMERGENCY TELEPHONES

This application is a continuation of PCT International Application No. PCT/FI2014/050229 which has an International filing date of Mar. 28, 2014, the entire contents of which are incorporated herein by reference.

FIELD OF THE INVENTION

The present invention relates to elevator emergency telephony. In particular, the present invention relates to processing test calls from elevator emergency telephones.

BACKGROUND OF THE INVENTION

Nowadays, new elevators typically include an emergency telephone. Furthermore, it is typically required that these emergency telephones are periodically tested. For example, European standards require that an elevator emergency telephone must make a test call at least every 3 days to a call receiver outside the building where the elevator is located. The test call ensures that the emergency telephone and its telecommunication means are in order.

The test call may be either a voice call or a data call, and the call must be such that the elevator the call is coming from can be identified. Since the calling elevator must be identified, the call must typically be answered. However, answering a call initiates phone costs for the caller, i.e. the elevator owner or the owner of the communication means of the elevator.

A customer care center of an elevator company may receive thousands of these test calls daily from both emergency telephones of its own manufacture as well as from third party emergency telephones. Receiving these check calls from various emergency telephone brands and versions requires many kinds of receivers with various telecommunication protocols, and plenty of telephone capacity and means to handle the capacity needed on the receiver side.

Today, a feature called Caller Line Identification (CLI) is in use in most countries. When the CLI is in place, the receiver of a call can identify from which telephone the call is coming from based on the CLI only—the call does not have to be answered at all and hence no costs are created for the caller. In other words, the CLI is a telephone service, available in analog and digital phone systems, that transmits a caller's telephone number to the called party's telephone equipment during the ringing signal, or when the call is being set up but before the call is answered.

However, the CLI is not widely utilized in test calls for elevator emergency telephones due to a number of problems. For example, the CLI is not always active by default, and activating it might incur costs for the elevator telephone means owner. Also, in many cases there are several elevator emergency phones sharing one phone line in a building, and hence a single elevator cannot be identified since the caller is one of the elevator emergency telephones on the same single line. Also, all elevator emergency telephones do not necessarily support a CLI based test call, e.g. an elevator emergency telephone might be configured to wait that a test call is answered and acknowledged in a certain way.

Accordingly, an object of the present invention is to alleviate the problems described above and to introduce a solution that allows utilizing the CLI feature in receiving test emergency calls from any kind of elevator emergency telephones.

SUMMARY OF THE INVENTION

A first aspect of the present invention is a method of processing test calls from elevator emergency telephones. An incoming call attempt from an elevator emergency telephone is received at an elevator emergency call receiver unit. The call attempt includes caller line identification, CLI, information. The CLI information included in the received call attempt is detected. Then, one of the following is performed:

a) disconnecting the call attempt to complete the test call processing;

b) in response to detecting the call attempt being released by the elevator emergency telephone within a predetermined time period, determining that the test call processing is completed; and c) in response to detecting the call attempt not being released by the elevator emergency telephone within the predetermined time period, answering the incoming call to enable the elevator emergency telephone to continue the test call processing.

A second aspect of the present invention is an elevator emergency call receiver unit. The elevator emergency call receiver unit comprises at least one processor, and at least one memory including computer program code. The at least one memory and the computer program code are configured to, with the at least one processor, cause the elevator emergency call receiver unit at least to perform:

receiving an incoming call attempt from an elevator emergency telephone, the call attempt including caller line identification, CLI, information;

detecting the CLI information included in the received call attempt, and performing one of:

a) disconnecting the call attempt to complete the test call processing;

b) in response to detecting the call attempt being released by the elevator emergency telephone within a predetermined time period, determining that the test call processing is completed; and c) in response to detecting the call attempt not being released by the elevator emergency telephone within the predetermined time period, answering the incoming call to enable the elevator emergency telephone to continue the test call processing.

A third aspect of the present invention is a computer program stored on a computer readable medium and comprising code adapted to cause the following steps when executed on the elevator emergency call receiver unit:

receiving an incoming call attempt from an elevator emergency telephone, the call attempt including caller line identification, CLI, information;

detecting the CLI information included in the received call attempt, and performing one of:

a) disconnecting the call attempt to complete the test call processing;

b) in response to detecting the call attempt being released by the elevator emergency telephone within a predetermined time period, determining that the test call processing is completed; and c) in response to detecting the call attempt not being released by the elevator emergency telephone within the predetermined time period, answering the incoming call to enable the elevator emergency telephone to continue the test call processing.

A fourth aspect of the present invention is a system comprising an elevator emergency telephone, a test call database, and an elevator emergency call receiver unit according to the second aspect above.

In an embodiment of the invention, a test call database is updated based on the detected CLI information.

In an embodiment of the invention, c) further comprises establishing a data communication protocol with the elevator emergency telephone.

In an embodiment of the invention, c) further comprises receiving an identification of the elevator emergency telephone via the established data communication protocol.

In an embodiment of the invention, c) further comprises receiving type information about the received call attempt.

In an embodiment of the invention, c) further comprises further updating the test call database based at least on the received identification of the elevator emergency telephone.

It is to be understood that the aspects and embodiments of the invention described above may be used in any combination with each other. Several of the aspects and embodiments may be combined together to form a further embodiment of the invention. A method, an elevator emergency call receiver unit, a system or a computer program which is an aspect of the invention may comprise at least one of the embodiments of the invention described above.

The invention allows utilizing the CLI feature in receiving test emergency calls from any kind of elevator emergency telephones. This in turn makes the receiver side significantly simpler, and reduces operating costs associated with elevators due to minimizing telephone costs of emergency test calls.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIGS. 1a-1c are signaling diagrams illustrating methods according to embodiments of the present invention.

DETAILED DESCRIPTION OF THE INVENTION

Figure 1C:
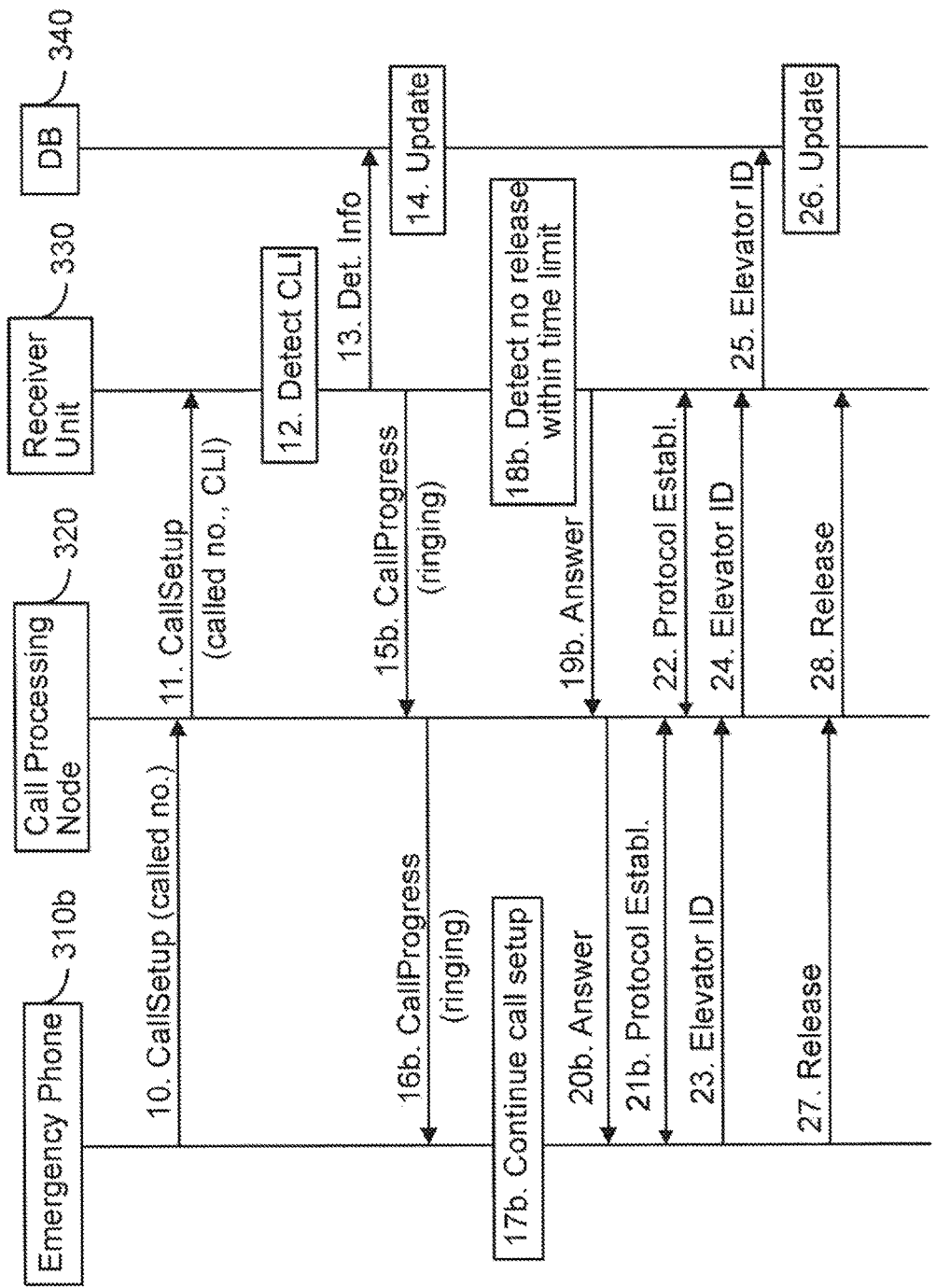

Reference will now be made in detail to the embodiments of the present invention, examples of which are illustrated in the accompanying drawings.

FIG. 1a is a signaling diagram illustrating a method according to an embodiment of the present invention. In this embodiment, the elevator emergency telephone 310a is not configured to wait that its test call is answered. Furthermore, the elevator emergency telephone 310a does not share its telephone line outside its building with any other elevator emergency telephone.

An incoming call attempt from the elevator emergency telephone 310a is received at an elevator emergency call receiver unit 330, step 11. The call attempt includes caller line identification, CLI, information, including at least the telephone number of the calling party which in this embodiment is the elevator emergency telephone 310a. The call attempt may be sent e.g. as a 'call setup' signaling message (including the telephone number of the called party) from the elevator emergency telephone 310a to a call processing node 320, step 10. The call processing node 320 may be e.g. a switch/exchange or an IP multimedia server. The call processing node 320 may add the CLI information to the 'call setup' signaling message, and then forward the 'call setup' signaling message with the added CLI information to the elevator emergency call receiver unit 330 based on the telephone number of the called party included in the received 'call setup' signaling message, step 11. The elevator emergency call receiver unit 330 may be arranged e.g. in a customer care center of an elevator company.

The CLI information included in the received call attempt is detected at the elevator emergency call receiver unit 330, step 12. That is, the elevator emergency call receiver unit 330 detects the telephone number from which the call attempt is coming from, i.e. the telephone number of the elevator emergency telephone 310a. At step 13, information about having received a test emergency call from an elevator associated with the detected calling number is sent from the elevator emergency call receiver unit 330 to a test call database 340. Then, the test call database 340 is updated based on the received information. For example, a green flag may be raised for the elevator associated with the detected calling number for today's test call.

After detecting the CLI information included in the received call attempt, the call attempt is disconnected to complete the test call processing, steps 15a-16a. For example, a 'release' signaling message may be sent from the elevator emergency call receiver unit 330 to the call processing node 320, step 15a, and forwarded to the elevator emergency telephone 310a, step 16a. Since in this embodiment, the elevator emergency telephone 310a is not configured to wait that its test call is answered, disconnecting the call attempt ends the test call processing.

It is to be noted that steps 13-14 need not necessarily be performed before step 15a, but may instead be performed after step 15a or after steps 15a and 16a.

FIG. 1b is a signaling diagram illustrating a method according to an embodiment of the present invention. Similar to the embodiment of FIG. 1a, in the embodiment of FIG. 1b the elevator emergency telephone 310a is not configured to wait that its test call is answered. Furthermore, the elevator emergency telephone 310a does not share its telephone line outside its building with any other elevator emergency telephone.

Steps 10-14 of the embodiment of FIG. 1b are similar to those of the embodiment of FIG. 1a, and are therefore not described again here.

The embodiment of FIG. 1b may be used instead of the embodiment of FIG. 1a if the elevator emergency call receiver unit 330 is not capable to disconnect the call attempt.

Accordingly, instead of the 'release' signaling message of FIG. 1a, at steps 15b and 16b e.g. 'call progress' signaling may be sent from the elevator emergency call receiver unit 330 to the elevator emergency telephone 310a which the elevator emergency telephone 310a may detect as one or more ringing signals or tones.

At step 17a, the elevator emergency telephone 310a detects that a predetermined threshold has been exceeded without the call attempt having been disconnected or released. The threshold may be e.g. an amount of time, such as 15 seconds, or an amount of ringing tones, such as 3 ringing tones.

At step 18a, in response to detecting that the threshold was exceeded at step 17a, the elevator emergency telephone 310a disconnects the call attempt. For example, a 'release' signaling message may be sent from the elevator emergency telephone 310a to the call processing node 320, step 18a, and forwarded to the elevator emergency call receiver unit 330, step 19a.

At step 20a, the elevator emergency call receiver unit 330 detects that the call attempt was released by the elevator emergency telephone 310a within a predetermined time period, and determines in response that the test call processing is completed, step 21a. The predetermined time period may be e.g. 15 seconds.

In the embodiments of FIGS. 1a and 1b, the test call attempt will remain very short, such as approximately 15 seconds. This will free a lot of resources from the elevator emergency call receiver unit 330 since a test call nowadays with prior art arrangements typically takes 45-90 seconds of the receiver time.

FIG. 1c is a signaling diagram illustrating a method according to an embodiment of the present invention. This embodiment may be used in a case in which the elevator emergency telephone 310b is configured to wait that its test call is answered. Additionally, the embodiment of FIG. 1c may be used in a case in which the elevator emergency telephone 310b shares its telephone line outside its building with at least one other elevator emergency telephone.

Steps 10-16b of the embodiment of FIG. 1c are similar to those of the embodiment of FIG. 1b, and are therefore not described again here.

Here, the elevator emergency telephone 310b continues the call setup process at step 17b. At step 18b, the elevator emergency call receiver unit 330 detects that the above described predetermined time period (such as 15 seconds) has been exceeded without the call attempt having been disconnected or released by the elevator emergency telephone 310b. In response, at steps 19b and 20b, the elevator emergency call receiver unit 330 answers the call attempt to enable the elevator emergency telephone to continue the test call processing.

Then, at steps 21b and 22, a data communication protocol is established between the elevator emergency telephone 310b and the elevator emergency call receiver unit 330. The data communication protocol may be e.g. a DTMF (dual-tone multi-frequency) signaling based protocol, such as CPC, P100, ANTENNA, or ADEMCO.

At steps 23 and 24, an identification of the elevator emergency telephone 310b is sent via the established data communication protocol from the elevator emergency telephone 310b to the elevator emergency call receiver unit 330. For example, if the elevator emergency telephone 310b shares its telephone line outside its building with at least one other elevator emergency telephone in another elevator, the identification of the elevator emergency telephone 310b may be an identification indicating the elevator order number of the elevator emergency telephone 310b among the elevators on the same line.

For example, when there are 4 elevators on the same telephone line and elevator number 2 calls in, the elevator emergency call receiver unit 330 gets the calling telephone number with the CLI, and is already able to identify from which site/building the call attempt is coming from. Then, the call attempt continues over 15 seconds after which the elevator emergency call receiver unit 330 answers the call attempt, and receives the elevator ID "2" e.g. as a DTMF character 2.

In addition to the identification of the elevator emergency telephone 310b, type information about the call attempt may be sent via the established data communication protocol from the elevator emergency telephone 310b to the elevator emergency call receiver unit 330 at steps 23 and 24. The type may include e.g. a check call, a battery failure message or an emergency call from an entrapped person in the elevator.

At steps 25-26, the test call database 340 may be further updated based at least on the received identification of the elevator emergency telephone 310b.

At step 27, the elevator emergency telephone 310b disconnects the call attempt. For example, a 'release' signaling message may be sent from the elevator emergency telephone 310b to the call processing node 320, step 27, and forwarded to the elevator emergency call receiver unit 330, step 28. Alternatively, the elevator emergency call receiver unit 330 may disconnect the call attempt.

In the embodiment of FIG. 1c, the test call attempt will still remain very short compared to prior art, such as approximately 20 seconds.

As discussed above, the invention allows utilizing the CLI feature in receiving test emergency calls from any kind of elevator emergency telephones, regardless of whether the elevator emergency telephone is configured to wait that its test call is answered or not, and regardless of whether the elevator emergency telephone shares its telephone line outside its building with at least one other elevator emergency telephone or not. Accordingly, the invention requires no modification of the elevator emergency telephones.

Figure 2A:
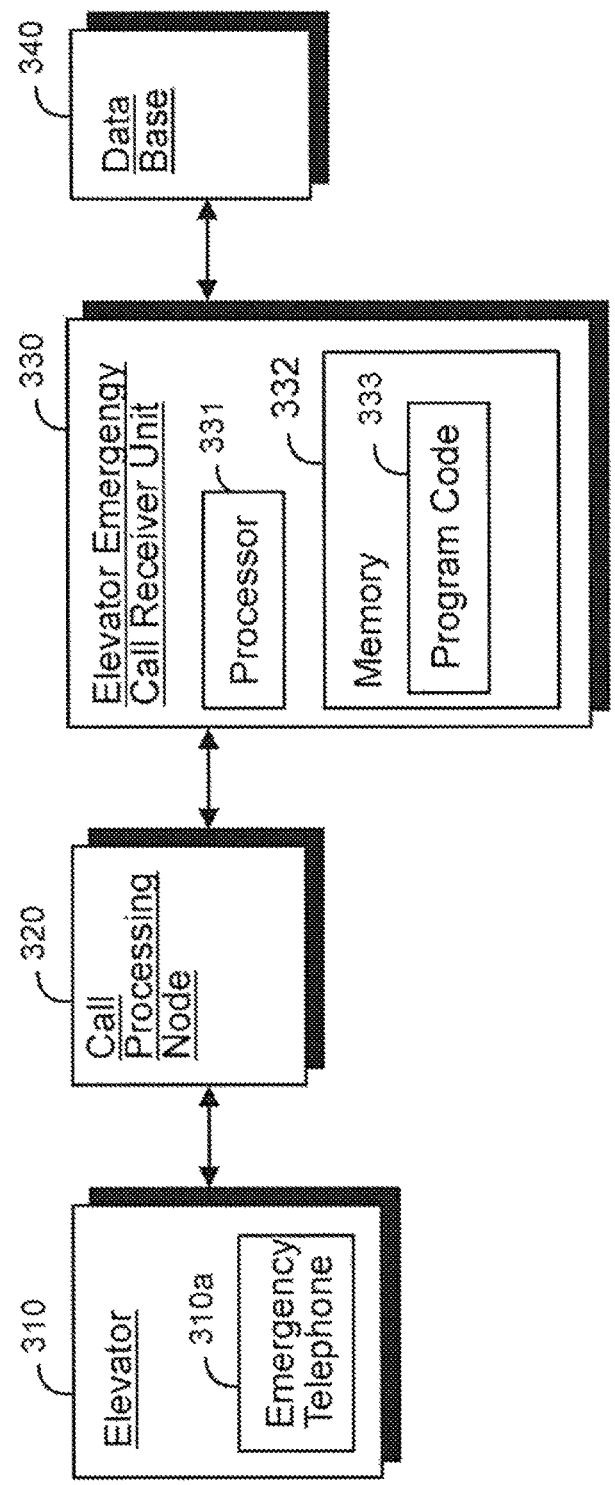
FIGS. 2a-2b are block diagrams illustrating apparatuses according to embodiments of the present invention.

FIG. 2a is a block diagram illustrating apparatuses according to an embodiment of the present invention. The apparatuses include an elevator emergency telephone 310a arranged in an elevator 310. As discussed in connection with FIGS. 1a and 1b, the elevator emergency telephone 310a is not configured to wait that its test call is answered. Furthermore, the elevator emergency telephone 310a does not share its telephone line outside its building with any other elevator emergency telephone.

The elevator emergency telephone 310a is connected via a telecommunication connection to a call processing node 320 which may be e.g. a telephone switch/exchange or an IP (Internet Protocol) multimedia server. The call processing node 320 is connected via a telecommunication connection to an elevator emergency call receiver unit 330 which may be located e.g. in a customer care center of an elevator company. The elevator emergency call receiver unit 330 is connected to a test call database 340 which may be internal or external to the elevator emergency call receiver unit 330.

The elevator emergency call receiver unit 330 comprises at least one processor 331 and at least one memory 332 including computer program code 333. The at least one memory 332 and the computer program code 333 are configured to, with the at least one processor 331, cause the elevator emergency call receiver unit 330 at least to perform:

receiving an incoming call attempt from an elevator emergency telephone 310a, the call attempt including caller line identification, CLI, information;

detecting the CLI information included in the received call attempt, and performing one of:

a) disconnecting the call attempt to complete the test call processing; and b) in response to detecting the call attempt being released by the elevator emergency telephone 310a within a predetermined time period, determining that the test call processing is completed.

The at least one memory 332 and the computer program code 333 may be further configured to, with the at least one processor 331, cause the elevator emergency call receiver unit 330 at least to perform: updating the test call database 340 based on the detected CLI information.

Figure 2B:
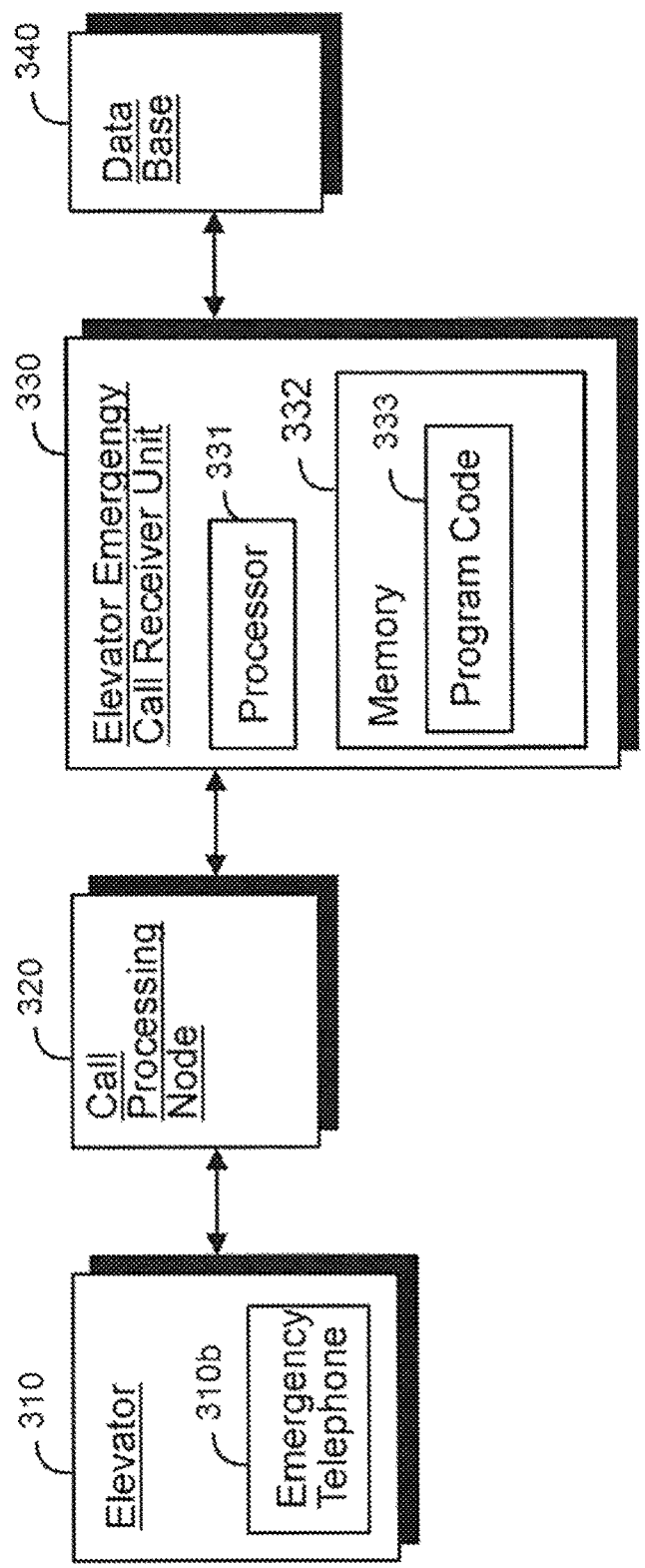

FIG. 2b is a block diagram illustrating apparatuses according to an embodiment of the present invention. The apparatuses include an elevator emergency telephone 310b arranged in an elevator 310. As discussed in connection with FIG. 1c, the elevator emergency telephone 310b may be configured to wait that its test call is answered. Alternatively, the elevator emergency telephone 310b may share its telephone line outside its building with at least one other elevator emergency telephone The elevator emergency telephone 310b is connected via a telecommunication connection to a call processing node 320 which may be e.g. a telephone switch/exchange or an IP (Internet Protocol) multimedia server. The call processing node 320 is connected via a telecommunication connection to an elevator emergency call receiver unit 330 which may be located e.g. in a customer care center of an elevator company. The elevator emergency call receiver unit 330 is connected to a test call database 340 which may be internal or external to the elevator emergency call receiver unit 330.

The elevator emergency call receiver unit 330 comprises at least one processor 331 and at least one memory 332 including computer program code 333. The at least one memory 332 and the computer program code 333 are configured to, with the at least one processor 331, cause the elevator emergency call receiver unit 330 at least to perform:

receiving an incoming call attempt from an elevator emergency telephone 310b, the call attempt including caller line identification, CLI, information;

detecting the CLI information included in the received call attempt, and performing:

c) in response to detecting the call attempt not being released by the elevator emergency telephone 310b within the predetermined time period, answering the incoming call to enable the elevator emergency telephone 310b to continue the test call processing.

The at least one memory 332 and the computer program code 333 may be further configured to, with the at least one processor 331, cause the elevator emergency call receiver unit 330 at least to perform: updating the test call database 340 based on the detected CLI information.

The at least one memory 332 and the computer program code 333 may be further configured to, with the at least one processor 331, cause the elevator emergency call receiver unit 330 at least to perform: establishing, in c), a data communication protocol with the elevator emergency telephone 310b. The data communication protocol was described in more detail in connection with FIG. 1c.

The at least one memory 332 and the computer program code 333 may be further configured to, with the at least one processor 331, cause the elevator emergency call receiver unit 330 at least to perform: receiving an identification of the elevator emergency telephone 310b via the established data communication protocol. The identification was described in more detail in connection with FIG. 1c.

The at least one memory 332 and the computer program code 333 may be further configured to, with the at least one processor 331, cause the elevator emergency call receiver unit 330 at least to perform: receiving type information about the received call attempt. The type information was described in more detail in connection with FIG. 1c.

The at least one memory 332 and the computer program code 333 may be further configured to, with the at least one processor 331, cause the elevator emergency call receiver unit 330 at least to perform: further updating the test call database 340 based at least on the received identification of the elevator emergency telephone 310b.

The exemplary embodiments can include, for example, any suitable servers, workstations, PCs, laptop computers, other devices, and the like, capable of performing the processes of the exemplary embodiments. The devices and subsystems of the exemplary embodiments can communicate with each other using any suitable protocol and can be implemented using one or more programmed computer systems or devices.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of processing a test call from an elevator emergency telephone, the method comprising:
receiving, at an elevator emergency call receiver, a call attempt from the elevator emergency telephone, the call attempt being sent as a call setup signaling message of the test call and including caller line identification (CLI) information;
detecting the CLI information included in the call attempt prior to answering the test call;
determining whether processing of the test call is complete by determining if the elevator emergency telephone has released the call attempt within a set time period;
answering the test call to enable the elevator emergency telephone to further process the test call in response to determining that the processing of the test call is not complete; and
further processing the test call by receiving an identification of the elevator emergency telephone different from the CLI information after answering the test call.

2. The method according to claim 1, further comprising:
updating a test call database based on the detected CLI information.

3. The method according to claim 1, further comprising:
establishing a data communication protocol with the elevator emergency telephone.

4. The method according to claim 3, wherein the receiving further comprises:
receiving type information about the received call attempt.

5. The method according to claim 2, wherein the updating further comprises:
updating the test call database based at least on the received identification of the elevator emergency telephone.

6. A non-transitory computer readable medium including computer readable instruction that, when executed on a processor of a elevator emergency call receiver, cause the processor to,
receive, at the elevator emergency call receiver, a call attempt from an elevator emergency telephone during a test call, the call attempt being sent as a call setup signaling message of the test call and including caller line identification (CLI) information,
detecting the CLI information included in the call attempt prior to answering the test call,
determining whether processing of the test call is complete by determining if the elevator emergency telephone has released the call attempt within a set time period,
answering the test call to enable the elevator emergency telephone to further process the test call in response to determining that the processing of the test call is not complete, and
further processing the test call by receiving an identification of the elevator emergency telephone different from the CLI information after answering the test call.

7. An elevator emergency call receiver, comprising:
at least one memory including computer program code; and
at least one processor configured to execute the computer program code to,
receive a call attempt during a test call from an elevator emergency telephone, the call attempt including caller line identification (CLI) information,
detect the CLI information included in the call attempt,
determine whether the processing of the test call is completed la determining if the elevator emergency telephone has released the call attempt within a set time period,
answer the test call to enable the elevator emergency telephone to continue the processing of the test call if the processing of the test call is not complete, and
further process the test call by receiving an identification of the elevator emergency telephone different from the CLI information after answering the test call.

8. The elevator emergency call receiver according to claim 7, wherein the at least one memory and the computer program code are further configured to, with the at least one processor, cause the elevator emergency call receiver to:
update a test call database based on the CLI information.

9. The elevator emergency call receiver according to claim 7, wherein the at least one memory and the computer program code are further configured to, with the at least one processor, cause the elevator emergency call receiver to:
establish a data communication protocol with the elevator emergency telephone.

10. The elevator emergency call receiver according to claim 9, wherein the at least one memory and the computer program code are further configured to, with the at least one processor, cause the elevator emergency call receiver to:
receive type information about the call attempt.

11. The elevator emergency call receiver according to claim 7, wherein the at least one memory and the computer program code are further configured to, with the at least one processor, cause the elevator emergency call receiver to:
update a test call database based at least on the identification of the elevator emergency telephone.

12. A system, comprising:
an elevator emergency telephone;
a test call database; and
the elevator emergency call receiver according to claim 7.

* * * * *